United States Patent

[11] 3,607,378

[72] Inventor Edward M. Ruggiero, Dallas, Tex.
[21] Appl. No. 869,957
[22] Filed Oct. 27, 1969
[45] Patented Sept. 21, 1971
[73] Assignee Texas Instruments Incorporated, Dallas, Tex.
Continuation of application Ser. No. 606,177, Dec. 30, 1966, now abandoned.

[54] TECHNIQUE FOR DEPOSITING SILICON DIOXIDE FROM SILANE AND OXYGEN
4 Claims, 1 Drawing Fig.

[52] U.S. Cl. 117/201, 117/106 R, 117/135.1
[51] Int. Cl. C23c 11/00
[50] Field of Search 117/106, 106 A, 106 D, 135.1, 201; 23/182, 182 V

[56] References Cited
UNITED STATES PATENTS

| | | | |
|---|---|---|---|
| 2,967,115 | 1/1961 | Henich | 117/46 |
| 3,117,838 | 1/1964 | Sterling et al. | 25/182 |
| 3,445,280 | 5/1969 | Takashi Tokuyana et al. | 117/106 X |
| 3,447,958 | 6/1969 | Shinkishi Kutsu et al. | 117/106 X |

*Primary Examiner*—Alfred L. Leavitt
*Assistant Examiner*—Wm. E. Ball
*Attorney*—Gary C. Honeycutt

ABSTRACT: A pinhole-free film of silicon dioxide is deposited on a substrate by the vapor phase oxidation of silane in dilute admixture with an inert carrier gas such as helium, for example. By maintaining a high flow rate of helium to carry the silane and oxygen upward in contact with an inverted substrate, in combination with an oxygen flow rate appreciably higher than that of silane, a high rate of silicon dioxide deposition is assured with a minimum of quartz smoke, and without excessive premature oxidation of the silane.

PATENTED SEP 21 1971 3,607,378
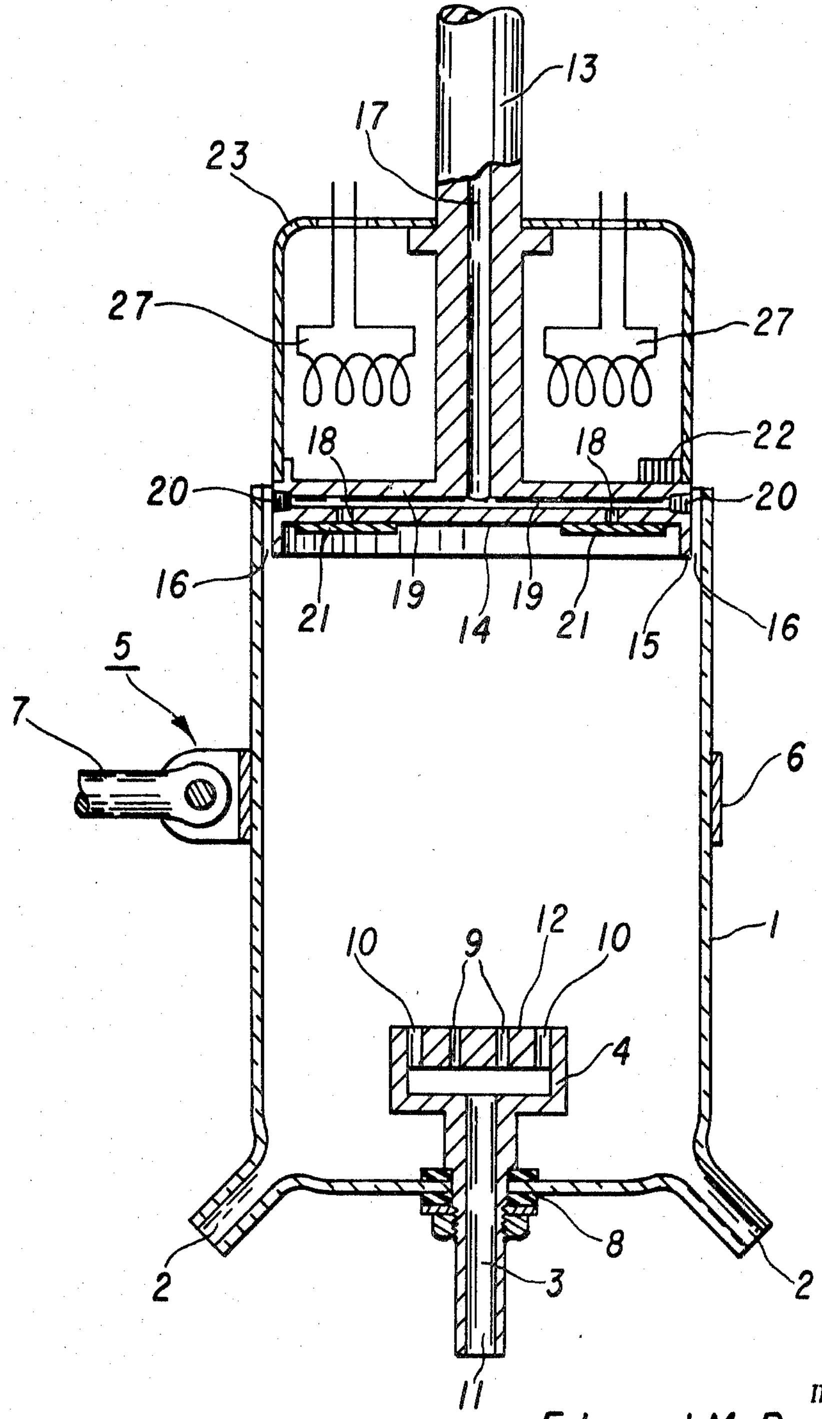
INVENTOR
Edward M. Ruggiero
BY Kenneth R. Glaser
ATTORNEY

TECHNIQUE FOR DEPOSITING SILICON DIOXIDE FROM SILANE AND OXYGEN

This application is a continuation of copending U.S. Pat. application Ser. No. 606,177 filed Dec. 30, 1966, now abandoned.

This invention relates to insulating films, and more particularly to a method of depositing silicon dioxide insulating films on substrates.

The development of a continuous thin film for use on semiconductors as, for example, a dielectric, an insulator, a diffusion mask, or a junction coating, has long been under study. Silicon dioxide has been the primary material of interest because of its chemical properties, transparency, insulating properties and compatibility with silicon fabrication technology. Films of $SiO_2$ have been deposited by such techniques as thermal oxidation of silicon, pyrolytic decompositions of organosilicon compounds, oxidation of silicon-organics, reactive sputtering of silicon in oxygen, evaporation, and more recently, RF sputtering.

For many applications a low-temperature-deposited oxide is necessary or more desirable than a thermally grown oxide. Such would be the case when a film of $SiO_2$ is required over materials other than silicon (i.e., germanium semiconductor metals, ceramics, etc.), or when high oxidation temperatures cannot be tolerated in the fabrication of a device. It would also be the case where the length of time required to grow a thick layer of $SiO_2$ (in excess of 10,000 A.) by thermal oxidation is prohibitive.

It is therefore an object of this invention to provide a novel technique for depositing silicon dioxide films.

It is another object of the invention to provide a novel technique for depositing silicon dioxide films at low temperatures.

It is a further object of the invention to provide a novel technique for depositing silicon dioxide films with high degrees of uniformity.

It is yet an further object of the invention to provide a novel technique for depositing silicon dioxide films which is capable of producing thick, smooth and defect-free films.

Various other objects, features and advantages of the invention will become apparent from the following description when read in conjunction with the appended claims and the attached drawing in which the sole figure is an illustration of apparatus utilized in practicing the present invention.

Described briefly, the invention is a technique for depositing silicon dioxide ($SiO_2$) in an *upward* direction on a substrate. A substrate on which the deposition is to be made in mounted at a position near the top of the reactor with the surface on which the deposition is to be made facing downward, the substrate being maintained at a desired elevated temperature. Silane ($SiH_4$) is introduced into the reactor in a carrier flow of helium at a position well below the substrate. Oxygen is also introduced into the reactor at a position will below the substrate. The gaseous inputs are directed toward the heated substrate at the top of the reactor resulting there in a silane-oxygen reaction described by the equation, $$SiH_4+O_2 \rightarrow SiO_2+2H_2O.$$

The silicon dioxide deposits thereby on the exposed underlying surface of the substrate.

Among the advantages of depositing in an upward direction is the prevention or elimination of both dust particles and "quartz smoke" from settling on the substrate, "quartz smoke" being finely divided quartz particles formed by the premature reaction of silane and oxygen in the reactor before these reactive components reach the heated substrate surface due to the fact that silane and oxygen react spontaneously even at room temperatures. This "quartz smoke" as well as the dust particles will, if not eliminated, provide defects or pinholes, as well as stress points which lead to ultimate cracking of the deposited oxide layer.

Referring now to the sole FIGURE of the drawing, reactor apparatus suitable for effecting the deposition is pictured.

The lower portion of the reactor is a cylindrically shaped glass container 1 opened at the top and having a plurality of inlets 2 which are evenly spaced around the perimeter of the glass container 1 through which the oxygen passes. There is a further inlet 3 in the base of the container through which the neck of a cylindrical dispersion head 4, of Teflon for example, passes. There is a seal 8 which prevents leakage at this inlet. Means for supporting the glass container 1 is indicated by 5. Such means includes a metal band 6 encircling the container, bolted to a rigid supporting member 7.

The dispersion head 4 has a plurality of holes 9 and 10 in it which serve to allow an even flow of helium-carrying silane through the surface 12 of the head. Since helium-carrying silane entering the head through neck 11 normally creates a higher pressure at the center of surface 12, a combination of small holes 9 located at the center of surface 12 and larger holes 10 located nearer the perimeter of surface 12 are provided to reduce the pressure variation across surface 12.

Located at the top of the reactor is a cylindrical aluminum shaft 13 attached to a cylindrical aluminum plate 14 with a lip 15 around its perimeter. The diameter of the plate 14 is slightly smaller than that of the glass container 1, so that when the plate 14 is lowered into the glass container 1, a groove 16 exists between the plate and the container permitting waste material to exit from the reactor to the atmosphere. The lip 15 around the perimeter of the plate prevents external air currents from disturbing the distribution of gases at the surface of the plate 14. The shaft 13 has a hole 17 running through it which intersects with several holes 19 running radially through the plate. These holes are terminated by plugs 20 at the perimeter of the plate and each such hole intersects with another hole 18 running from the surface of the plate 14 to it. Consequently, when a vacuum is applied to the open end of shaft 13, the pressure at the openings on plate 14 provided by holes 18 will drop. Be means of this pressure drop, substrates 21 upon which the oxide deposition is to be made can be held to the surface of plate 14 at each of these openings. Equipment similar to that illustrated allows the handling of eight silicon substrates, for example, of approximately 1¼ inches in diameter. The most uniform thickness of deposited oxide has been obtained by placing the substrates in a circle equidistant from the Teflon head 4.

Above the plate 14 is a series of heaters 27 disposed so as to maintain the temperature of the substrates 21 at a desired level. These heaters could be infrared lamps controlled by variacs. The advantage of infrared heating in the sensitivity of infrared lamps to incremental voltage change. Consequently, the temperature of the plate 14 can be monitored by a thermocouple 22 attached to it. The shaft 13, plate 14, and heaters 27 comprise the upper portion of the reactor and is enclosed by a shield 23 which assures the maintenance of the desired temperature. It is not necessary that this shield be airtight since no reaction occurs within it.

While not pictured, the shaft 13 is attached to a supporting mechanism which lowers and raises it and consequently the entire upper portion of the reactor into and out of its lower portion. The shaft is also motorized so that during the deposition cycle the entire upper portion of the reactor can be rotated. Such rotation results in a more uniform deposition of the oxide on the underside of the substrate 21.

During operation, pure silane (for example the type sold by Matheson Co., East Rutherford, N.J. is carried from an external tank (not shown) through a flowmeter to dilute with helium gas which is used as the carrier gas. This helium-silane mixture is then carried through tubing into the neck 11 of the Teflon head 4 and dispersed through the holes 9 and 10 in its top. Simultaneously therewith, oxygen is metered to the reactor through the evenly spaced inlets 2 of the base of the reactor. The oxygen and silane flows are directed toward the underside of the heated substrates 21.

The silane which reaches the underside of the heated substrate reacts with the oxygen, thereby depositing the silicon dioxide film. The thickness of this $SiO_2$ film may be monitored by noting interference color changes on a reference slice. This color method has been standardized by elipsometer readings and found to be correct to within 100–200 A. A time cycle can also be used for monitoring thickness since the deposition rate is constant for a given set of reactor conditions, flow rates, etc.

While some of the silane gas will prematurely react with the oxygen before these gases reach the substrates 21, thus producing the "quart smoke" referred to above, this "smoke" along with reaction byproduct water ($H_2O$), excess oxygen ($O_2$), and the helium-carrier gas are carried out the grooves or slots 16 rather than settling on the substrates 21. Some of the "quartz smoke" deposits on the walls of the reactor or settles to the bottom of the glass 1.

The deposition rate of silicon dioxide on the underside of the substrates 21 is primarily a function of the gas flow rates and the temperatures of the substrates 21 for a given set of reactor dimensions. It hay been observed, for example, for a reactor chamber or 6 inches in height and 4½inches in diameter, that by maintaining a high flow rate of helium (above 2 liters/minute) to carry the silane upward toward the substrates, a low flow rate of silane (below 15 cc. per minute) to avoid excessive reaction with the oxygen prior to impinging of the substrate surfaces, and an oxygen flow rate appreciably higher than that of silane, a high rate of and more complete oxidation at the substrate is assured with a minimum of "quartz smoke." For example, when the helium flow was maintained at approximately 4.5 liters/minute, the silane flow at approximately 7 cc. per minute, the oxygen flow at approximately 200 cc./minute, and the temperature of the substrates at approximately 325 °C., extremely continuous pinhole- or defect-free films of silicon dioxide deposited at the rate of 300– 500 A./minute. These essentially pinhole-free films were present at a thickness as small as 2,000 A.

Capacitors or multilevels fabricated of the upward-deposited silicon dioxide and aluminum or silicon dioxide and gold-vanadium oxide have resulted with yields up to 100 percent having as little as 1 pinhole per 50,000sq. mil.

What is claimed is:

1. In a process for the fabrication of a semiconductor device, the improved method of depositing a pinhole-free film of silicon dioxide on a surface thereof comprising the steps of:

placing a thermally sensitive semiconductor substrate in a reaction chamber so that said surface is facing downward;

heating said substrate;

introducing a flow of silane and inert gas into said reaction chamber below said substrate;

introducing a flow of oxygen into said reaction chamber below said substrate;

directing both of said flows in contact with said heated substrate to deposit a layer of silicon dioxide on said downward-facing surface;

maintaining the combined flow rates of said inert gas, silane, and oxygen sufficient to sweep quartz smoke past the substrate; and withdrawing the off-gases containing quartz smoke from the reaction chamber through a peripheral opening therein in the vicinity of the substrate.

2. A process as defined by claim 1 wherein said inert gas comprises helium passed at a flow rate above 2 liters per minute in combination with a flow rate of silane below 15 cc. per minute.

3. The process as described in claim 2 wherein said silane flow is approximately 7 cc. per minute, said helium flow is approximately 4.5 liters per minute, and said oxygen flow is approximately 200 cc. per minute.

4. In a process for the fabrication of a semiconductor silicon device, the improved method of depositing a silicon dioxide film on a surface thereof, said film having a thickness as small as 2,000 A., and having a pinhole density as low as 1 pinhole per 50,000 sq. mils, comprising the steps of:

a. placing a thermally sensitive silicon wafer substrate in a reaction chamber so that said surface is facing downward;

b. heating said substrate to an elevated temperature;

c. introducing silane and helium into said chamber below said substrate, at a rate of helium above 2 liters per minute and a flow rate of silane below 15 cc. per minute;

d. introducing oxygen into said chamber below said substrate, at a rate which exceeds the flow rate of silane;

e. directing said helium, silane and oxygen in contact with said heated substrate to deposit said silicon dioxide film on said downward-facing surface;

f. maintaining the combined flow rates of helium, silane and oxygen at a level sufficient to sweep quartz smoke past the substrate; and g. withdrawing the off gases and quartz smoke from the reaction chamber through a peripheral opening in the vicinity of the substrate.